United States Patent [19]

Ritter, Jr.

[11] 3,734,706
[45] May 22, 1973

[54] PRODUCING BENT TEMPERED GLASS SHEETS

[75] Inventor: George F. Ritter, Jr., Toledo, Ohio

[73] Assignee: Libbey-Owens-Ford Company, Toledo, Ohio

[22] Filed: Apr. 16, 1971

[21] Appl. No.: 134,672

[52] U.S. Cl. .................. 65/104, 65/106, 65/273, 65/275, 65/351
[51] Int. Cl. .................. C03b 27/00, C03b 23/02
[58] Field of Search ................... 65/104, 273, 275, 65/106, 114, 348, 351

[56] References Cited

UNITED STATES PATENTS

| | | | |
|---|---|---|---|
| 3,468,645 | 9/1969 | McMaster et al. | 65/104 X |
| 3,476,540 | 11/1969 | Ritter, Jr. et al. | 65/106 X |
| 3,481,724 | 12/1969 | Starr et al. | 65/114 X |
| 3,532,481 | 10/1970 | Chaumont | 65/114 |

Primary Examiner—Arthur D. Kellogg
Attorney—Collins and Oberlin

[57] ABSTRACT

Method and apparatus for producing bent tempered glass by heating a sheet of glass during movement along a horizontal path and toward a ring type bending mold located beneath the path, raising the mold when the heated sheet reaches a position directly over it to lift the sheet bodily from the path and rapidly enough to cause it to sag into conformity with the shaping surface of the mold, rapidly chilling the bent sheet on the raised mold to initiate the tempering thereof, and continuing the chilling without cessation during lowering of the mold to return the sheet to the path and until the tempering is complete.

10 Claims, 9 Drawing Figures

Patented May 22, 1973

INVENTOR.
George F. Ritter, Jr.

BY
Collins & Oberlin
ATTORNEYS

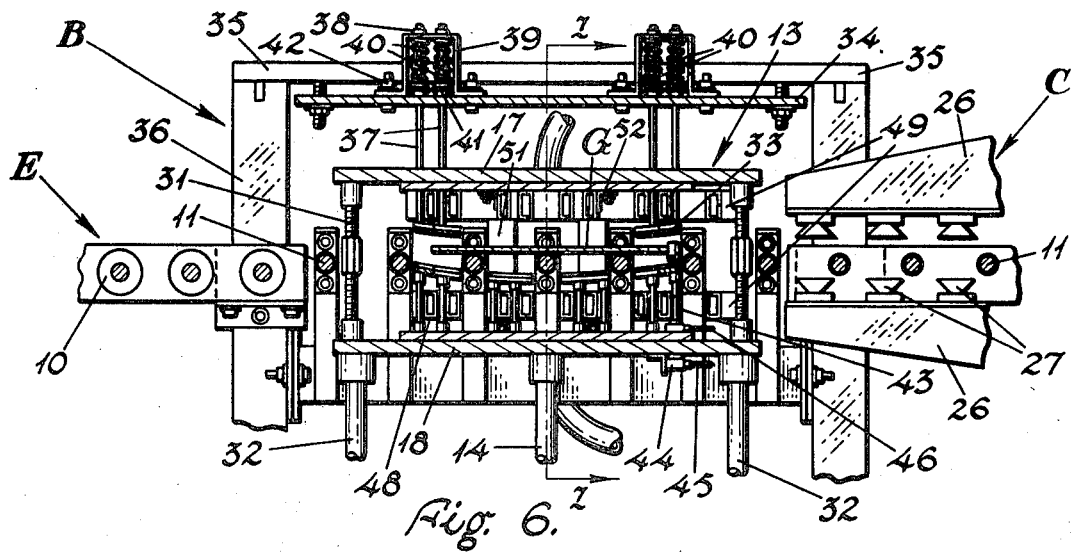
Fig. 6.
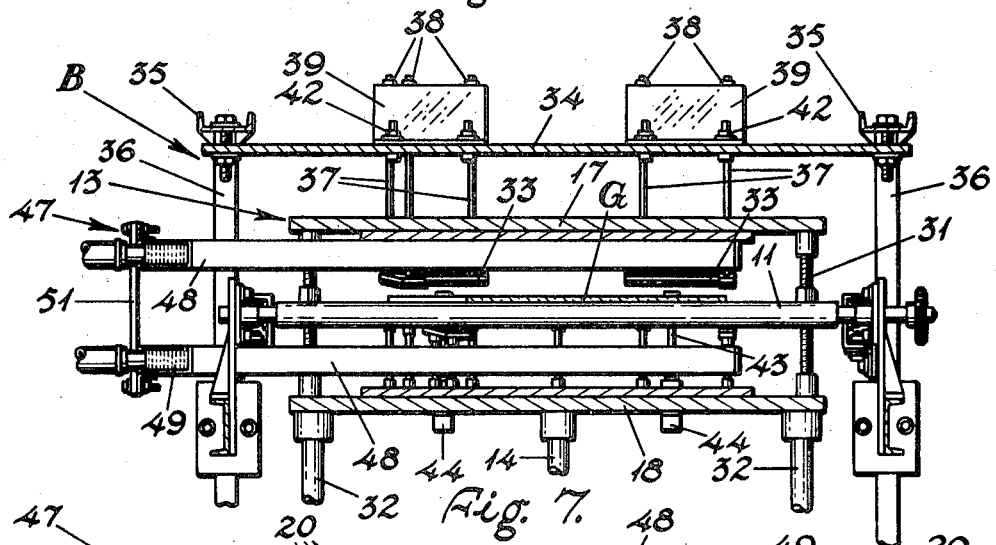
Fig. 7.
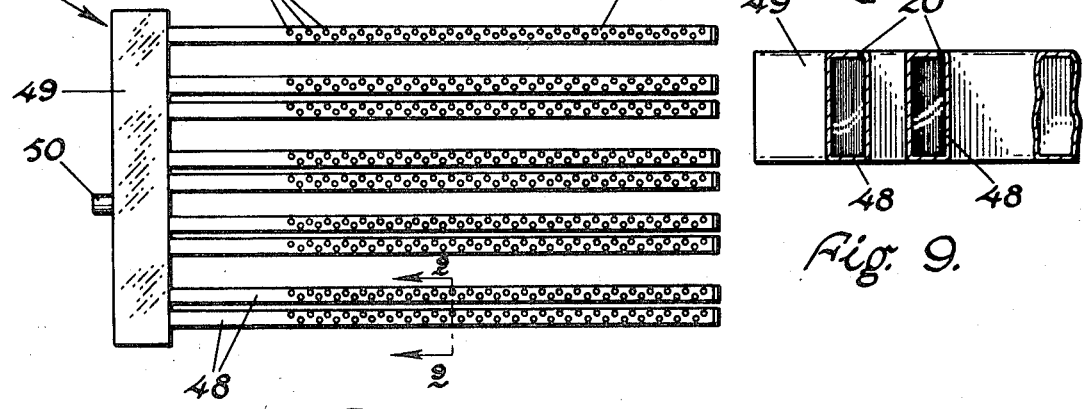
Fig. 8.
Fig. 9.
INVENTOR.
George F. Ritter, Jr.
BY
Collins & Oberlin
ATTORNEYS

PRODUCING BENT TEMPERED GLASS SHEETS

BACKGROUND

1. Field of the Invention

The present invention relates broadly to the production of bent and tempered glass sheets, and more particularly to an improved method of and apparatus for bending and tempering that is effective with very thin glass.

2. Description of the Prior Art

Both the bending and tempering of glass sheets are of course old and well known and it has become conventional commercial practice to produce relatively thick (one-fourth inch and up) bent, tempered glass plates and sheets in accurately predetermined curvatures and with acceptable breaking patterns.

Also, a bending technique known as IG (inertia and gravity) bending has recently become known (U.S. Pat. No. 3,476,540).

At the same time, however, there has been developing what is now a rapidly expanding demand for thin (0.160 inch and below) bent, tempered glass for various types of automotive use and, while every effort has been and is being made to meet the demand, it became evident at an early stage that previously known and heretofore widely accepted bending and tempering procedures did not lend themselves to processing thin glass and that successful bending and tempering of such glass presented a new and different set of problems.

Thus, as indicated in U.S. Pat. No. 3,454,389, one of the earliest that dealt directly with the subject, disappointing results from using conventional tempering procedures in processing thin glass may be due to the fact that, as the thickness of the glass decreases, the rate of cooling must be increased by increasing the volume of cooling fluid directed against the glass surface; and, although it may appear that this can be readily accomplished either by increasing the pressure of the fluid or the size of the equipment supplying it, experience has shown that special techniques are required to provide a commercially practicable solution to the problem.

In fact experienced workers in this art have expressed the opinion that air (which is the most commonly used cooling fluid) does not have the kind of heat conducting properties necessary to temper the thinner glass sheets regardless of how it is used.

SUMMARY OF THE INVENTION

According to the present invention, however, there is provided an improved method and apparatus for bending and tempering glass sheets whereby air, as well as other tempering media, can be employed to produce thin bent tempered glass sheets in a wide variety of sizes, shapes and curvatures, on a commercial production basis, and to meet rigid automotive requirements.

A primary object of this invention is the provision of a method and apparatus of this character by which heated glass sheets are bent into conformity with the shaping surface of an open or ring type bending mold under the influence of inertial and gravitational forces and then rapidly chilled in a single continuous operation that begins as the sheet is bent on the mold and continues until tempering of the glass is completed.

Another object is to provide such a method and apparatus in which flat glass sheets are heated to bending temperature during movement along a horizontal path, the heated sheets are lifted from the path to effect bending, and rapid chilling of the bent sheet to temper the glass is begun substantially simultaneously with the bending thereof, and while the sheet is in raised position, and is continued until tempering is complete.

Further objects and advantages will become apparent during the course of the following description, when read in connection with the accompanying drawings wherein like numerals refer to like parts throughout.

BRIEF DESCRIPTION OF THE DRAWINGS

FIG. 6 is a view similar to FIG. 4, but of a modified form of apparatus, and on a larger scale;

FIG. 7 is a transverse, sectional view taken substantially along the line 7—7 in FIG. 6;

FIG. 8 is a detail view of a preferred form of blast head for the bending and initial tempering apparatus; and FIG. 9 is a transverse, sectional view taken substantially along the line 9—9 in FIG. 8.

DESCRIPTION OF THE PREFERRED EMBODIMENTS

Figures 1, 2, 3, 4, 5:
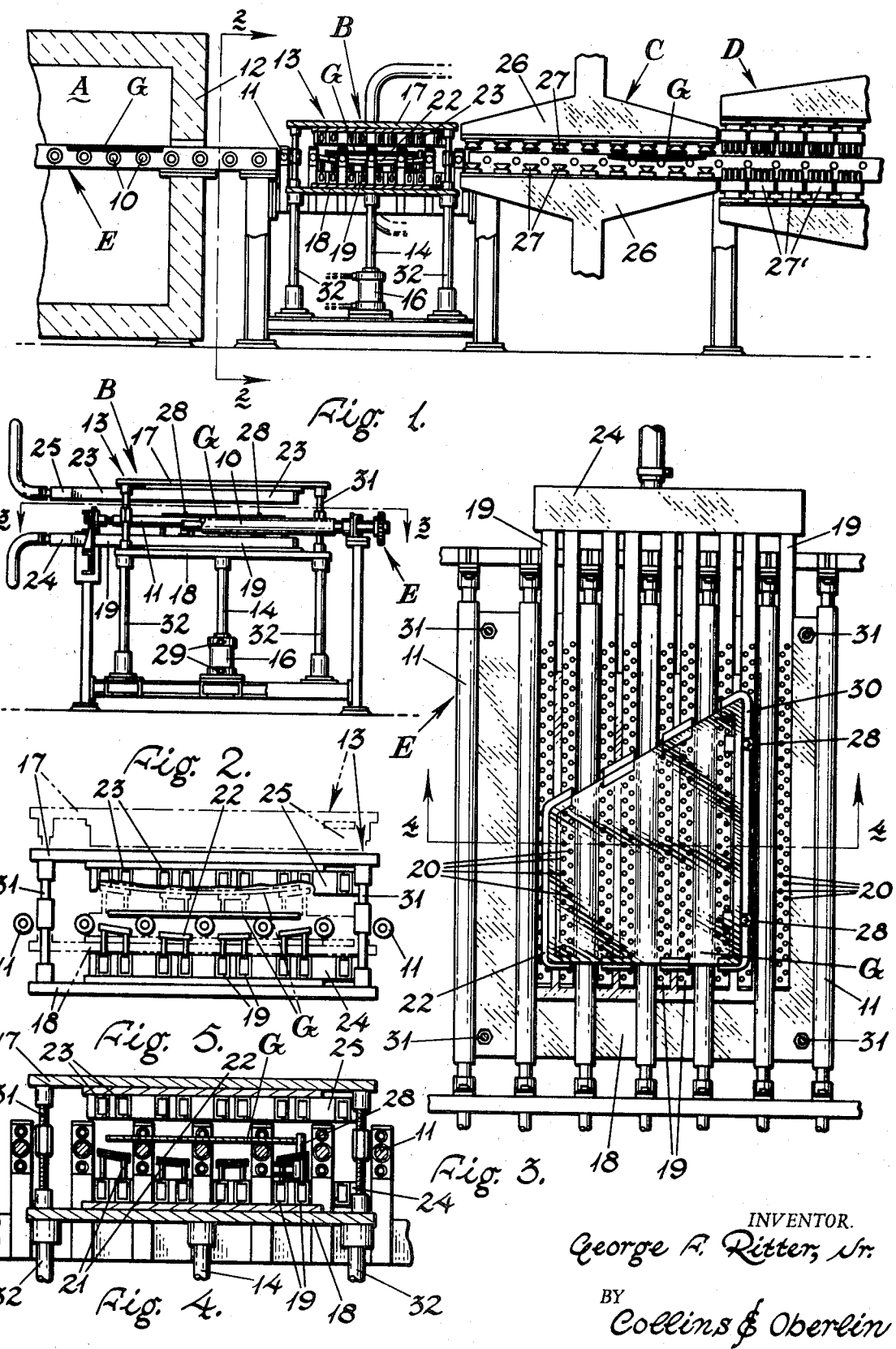
FIG. 1 is a longitudinal, vertical sectional view through a bending and tempering apparatus constructed in accordance with the invention.
FIG. 2 is a transverse sectional view looking into the bending and initial tempering area of the apparatus and taken substantially along the line 2—2 in FIG. 1.
FIG. 3 is a plan view of the bending apparatus, on an enlarged scale, and taken substantially along the line 3—3 in FIG. 2.
FIG. 4 is a detail view of the bending and initial tempering apparatus of FIG. 1, taken substantially along the line 4—4 in FIG. 3.
FIG. 5 is a view similar to FIG. 4, illustrating the movement of the parts of the apparatus during bending of a glass sheet.

Referring now more particularly to the drawings, there is illustrated in FIGS. 1 through 4 one form of apparatus designed to bend and temper glass sheets in accordance with the invention. Briefly stated, this apparatus comprises a heating section A, a bending and quenching section B, an intermediate quenching and/or cooling section C, and a cooling section D; all arranged in horizontally aligned end to end relation. To move glass sheets to be treated through the several sections along a generally straight path, there is provided a conveyor system E which comprises a series of rollers 10 for handling the glass sheets in and adjacent the heating area and a series of relatively smaller rollers 11 for handling them in the bending, quenching and cooling areas.

The rollers of the conveyor system E are suitably driven, and the tunnel type furnace 12 of the heating section is heated, by conventional means (not shown) so that flat glass sheets G introduced into the entrance end of the furnace 12 will be carried forwardly and heated to bending temperature, or to substantially the softening point of the glass, by the time they reach the bending and quenching section B.

Within the section B a carriage 13 is mounted for vertical movement at the end of a rod 14 attached to a piston operating within an air or hydraulic cylinder 16. The carriage 13 comprises a pair of vertically spaced and aligned platens 17 and 18, the lower of which supports a series of spaced blast head tubes 19 extending transversely thereof and provided on their upper surfaces with openings 20. Mounted above the tubes 19 on rods 21 extending upwardly therefrom is a segmented ring type female bending mold 22 having its segments spaced from one another and located between adjacent rollers 11 of the conveyor system E.

A second series of blast head tubes 23 depend and are supported from the upper platen 17 and each series of tubes 19 and 23 communicates, at one end thereof, with manifolds 24 and 25 respectively connected to a supply conduit 26 through which air or other quenching fluid under pressure can be supplied.

In the intermediate section C opposed plenum chambers 26 are provided with blast heads 27 of conventional construction but capable of directing cooling fluid against opposite surfaces of glass sheets moving through this section over the conveyor system in a manner to either rapidly chill or slowly cool the same depending on requirements; and, beyond the blast heads 27, in the cooling section D, are a second series of heads 27', also of conventional construction, but adapted only to slowly cool opposite surfaces of the glass sheets, and so continue bringing them down toward room temperature, after they have previously been rapidly chilled to quench and completely temper them.

In performing the method of the invention on the apparatus just described, successive sheets of glass G, in the flat, are fed into the entrance end (not shown) of the furnace 12 in the heating section A. As a heated flat sheet leaves the furnace and moves into section B, it encounters suitable stop means 28 (FIGS. 3 and 4) that are positioned to interrupt forward movement of a glass sheet G when it reaches a point within the section B where it is in proper working alignment with the bending mold 22. At the same time the stops 28 are so located laterally that they will also act to correctly align the forward edge of the stopped sheet with the mold.

Immediately thereafter, fluid is introduced into the lower end of the cylinder 16 through the conduit 29, causing the mold 22 to be raised vertically to lift the glass sheet from the rollers 11 with sufficient momentum to cause the heat softened glass to bend by the combined forces of inertia and gravity into conformity with the shaping surface 30 of the mold (dotted lines in FIG. 5). At the same time cooling fluid at high pressure is blown against opposite surfaces of the bent sheet from the openings 20 in the opposed blast head tubes 19 and 23 to rapidly chill and quench the hot glass, and this chilling is continued as the mold 22 is moved downwardly, by introducing fluid into the upper end of the cylinder 16, to return the bent and at least partially quenched sheet to the rollers 11. By this time the stop means 28 will have been moved out of the way and forward movement of the bent glass along the conveyor system E is immediately continued.

In some cases the bent glass sheet will have been completely quenched and fully tempered by the time it is lowered onto the conveyor, in which case the cooling fluid supplied to the blast heads 27 in the intermediate section C will be adjusted to merely assist in slowly cooling the bent and tempered glass toward room or handling temperature. On the other hand, if the bent sheet has not been completely tempered by the time it is redeposited on the conveyor system, the fluid supplied to the blast heads 27 will be adjusted as to temperature and pressure to continue the rapid chilling and quenching action on the glass uninterruptedly and for a sufficient distance through the section C to complete the tempering. Thereafter, within the balance of the section C and/or in the section D the blast heads, and cooling fluid supplied to them, will be adjusted to slowly cool the fully tempered glass toward room temperature.

In either event, the important thing about the method of this invention is that rapid chilling or quenching of the glass beings as the sheet is bent, which may be before or as the mold reaches the limit of its upward movement, and this rapid chilling or quenching is continued without interruption until the glass is fully tempered.

Any conventional type of automatically or manually operated stop means 28 may be used. The distance between the superimposed carriage platens 17 and 18, and consequently the distance between the opposed series of blast head tubes 19 and 23 can be controlled by means of adjusting posts 31; and proper alignment of the carriage 13 during vertical movement thereof is assured by telescoping guide means 32.

In actual practice, bent tempered, ⅛ inch thick, glass sheets of the shape shown by the mold 22 in FIG. 3, and which met commercial requirements for automotive door lights, were completely tempered in approximately 8 seconds after leaving the heating furnace by the method of this invention.

Specifically, approximately 2½ seconds were required to carry the hot glass from the furnace to bending position. In 2¾ seconds the mold had lifted the sheet, the glass had bent by inertia and gravity, and rapid chilling had begun. By 3¼ seconds the mold had started down with the rapid chilling continuing. In 3¾ seconds the bent sheet was back on the conveyor and chilling was maintained continuously with the glass sheet passing beyond the ring mold in 6 seconds and continuing to be rapidly chilled for 2 more seconds as it traveled along the conveyor.

In the above, the actual quench time required for the ⅛ inch thick glass sheets was 4.2 seconds, and similar results were obtained by treating 0.090 and 0.140 inch thick glass sheets in a similar manner but employing quench times of 3 seconds and 5.0 seconds respectively.

Good results were obtained using both ¾ × 1½ inches and 1 × 1½ inches thin wall rectangular tubing for the blast head tubes 19 and 23, with 1/16 inch diameter holes drilled in the staggered pattern indicated in FIG. 3 to provide an overlapping air pattern on the glass. Also, distances of 1⅛ inches, plus or minus ¼ inch, from the blast head tubes to the glass where found desirable in treating ⅛ inch thick glass, with distances of approximately ⅜ inch giving good results for glass in 0.078 to 0.100 inch thicknesses. Although the adjacent walls of the blast head tubes 19 and 23 have been shown as generally parallel to the glass sheets G when in the flat, the tubes may, as well, be positioned and/or contoured to generally follow the curvature of the sheet when bent.

The form of the invention shown in FIGS. 6 to 9 of the drawings includes the same essential elements as are found in FIGS. 1 through 5. However, in addition, a plurality of presser feet 33 are provided to insure that, even with difficult or unusual shapes or sizes, the heat softened glass sheet will sink into full contact and conform precisely with the shaping surface of the mold 22 by the time the mold reaches its upper limit of vertical movement.

With an irregular shape, such as that of a glass sheet cut to fit the mold 22 of FIG. 3, for example, four of the feet 33 may be located in positions to engage the four corner areas of the glass sheet being bent as it is carried upwardly by the mold 22 and is sagging into contact with the shaping surface. Such locations are illustrated in FIGS. 6 and 7 of the drawings and, as there shown, a mounting plate 34 is supported above the carriage 13 from horizontal channel irons 35 of the general framework 36 of the machine. The four presser feet 33 are suspended from the plate 35 by rods 37 which extend upwardly therethrough and terminate in collars 38 that engage the upper walls of housings 39 and so limit downward movement of the feet 33. At the same time the feet are being continuously urged downwardly toward their lowermost position by the action of compression springs 40 contained within the housing and in surrounding relation to the rods 37, and working against intermediate collars 41 on the rods 37.

In operation, as a heat softened glass sheet is raised upwardly on the mold 22 and sags under inertia and gravity toward the shaping surface of the mold, the presser feet 33, when present, will resiliently press the corners of the glass sheet being bent against the shaping surface of the mold to insure full contact in these areas.

The housings 39 are secured to the plate 34 by appropriate fastening means 42 and the collars 38 and 41 are threaded or otherwise adjustably secured on the rods 37 to permit adjustments necessary to determine the point in its vertical movement at which the glass sheet will be engaged by the presser feet, and the amount of force to be exerted in mechanically urging the glass into contact with the mold.

FIG. 6 and 7 also illustrate one way of moving stops 28 into and out of sheet engaging position. Thus, the stops are carried at the upper ends of vertical rods 43 connected to pistons in air cylinders 44 and can be raised and lowered by introducing fluid into the desired one of conduits 45 and 46 while permitting it to discharge from the other.

Further, the blast heads shown in FIGS. 6 to 9 are of a movable or portable type which permit the same heads to be used in different bending and tempering sections or machines. To that end, and as best shown in FIGS. 8 and 9, the blast heads 47 are made up of blast head tubes 48 similar in construction to the tubes 23 and supplied with cooling fluid from similar manifolds 49 fed by a conduit 50. However, as best shown in FIG. 7, the upper and lower manifolds 49 are secured together by a manifold mounting plate 51 which permits the opposed blast heads to be slid as a unit into and out of operative position. When in operative position (FIGS. 6 and 7) the unit can be rigidly fixed in place by securing two of the centrally located tubes 48 to the upper plate of the carriage 13 with suitable brackets 52 (FIG. 6).

It is to be understood that the forms of the invention herewith shown and described are to be taken as illustrative embodiments only of the same, and that various changes in the shapes, sizes and arrangements of parts, as well as various procedural changes, may be resorted to without departing from the spirit of the invention as defined in the following claims.

I claim:

1. In a method of bending and tempering glass sheets in which a flat sheet of glass is heated to bending temperature during movement along a substantially horizontal path, the heated flat sheet is lifted from said path on the contoured shaping surface of a bending mold at a speed sufficient to create an inertial force which when combined with the force of gravity causes said sheet to bend into contact with said shaping surface, and the bent sheet is then lowered on said mold to return it to said path for continued movement therealong; the improvement which comprises initiating rapid chilling of said sheet, as the same is bent and while it is in lifted position on said mold, and continuing said rapid chilling without interruption until said glass is tempered.

2. A method as defined in claim 1 in which said chilling is initiated and continued uninterruptedly by directing blasts of a cooling fluid at high pressure against opposite surfaces of said sheet.

3. A method as defined in claim 1 in which said chilling is continued during lowering of said mold to return the sheet to said path.

4. A method as defined in claim 3 in which said chilling is continued until said sheet is returned to and during continued movement along said path.

5. A method as defined in claim 1 in which resilient mechanical pressure is exerted against selected portions of the upper surface of said sheet during said lifting thereof to urge said sheet into contact with said mold.

6. In apparatus for bending and tempering glass sheets, the combination; with a horizontal conveyor system for supporting flat and bent glass sheets in and moving them along a predetermined path, a bending mold having a shaping surface, and means for moving said mold vertically between a lowered position below said path and a raised position thereabove to lift a heated glass sheet from said conveyor system and cause it to bend by inertia and gravity into contact with said shaping surface and to subsequently lower the bent sheet to return said glass sheet to said path for continued movement therealong; of means movable with said mold for directing blasts of cooling fluid against opposite surfaces of said glass sheet while on and during movement of said mold.

7. Apparatus as defined in claim 6 in which means are also provided immediately adjacent said mold for continuing to direct blasts of cooling fluid against opposite surfaces of said bent sheet after its return to and during continued movement thereof along said path.

8. Apparatus as defined in claim 6 in which said cooling means comprises an upper and a lower set of blast head tubes arranged in spaced parallel relation and having staggered openings in opposed faces of each set, together with manifolds connecting each of said sets of tubes, and means is provided for supporting said sets of tubes in association and for movement with said mold and relatively to said conveyor system.

9. Apparatus as defined in claim 8 in which said manifolds connect said tubes at one end only, and means is provided to connect said manifolds together to permit said cooling means to be slid as a unit into association with said mold and said conveyor means.

10. Apparatus as defined in claim 6 in which means is provided for automatically and resiliently exerting mechanical pressure against selected portions only of said sheet to urge the same into contact with said mold during said lifting thereof.

* * * * *